(12) United States Patent
Okamoto et al.

(10) Patent No.: US 10,633,753 B2
(45) Date of Patent: Apr. 28, 2020

(54) ELECTRODE DEVICE AND METAL FOIL MANUFACTURING METHOD USING SAME

(71) Applicant: HITACHI METALS, LTD., Tokyo (JP)

(72) Inventors: Atsushi Okamoto, Yasugi (JP); Koji Sato, Yasugi (JP); Junichi Matsuda, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/060,656

(22) PCT Filed: Sep. 23, 2016

(86) PCT No.: PCT/JP2016/077931
§ 371 (c)(1),
(2) Date: Oct. 3, 2018

(87) PCT Pub. No.: WO2017/098774
PCT Pub. Date: Jun. 15, 2017

(65) Prior Publication Data
US 2019/0017186 A1    Jan. 17, 2019

(30) Foreign Application Priority Data
Dec. 11, 2015 (JP) .................. 2015-242149

(51) Int. Cl.
*C25D 1/04* (2006.01)
*C25D 17/12* (2006.01)
(Continued)

(52) U.S. Cl.
CPC ................ *C25D 1/04* (2013.01); *C25D 1/00* (2013.01); *C25D 5/18* (2013.01); *C25D 17/10* (2013.01);
(Continued)

(58) Field of Classification Search
CPC .......... C25D 17/12; C25D 17/10; C25D 1/04; C25D 21/14
See application file for complete search history.

(56) References Cited

U.S. PATENT DOCUMENTS 4,390,399 A    6/1983  McInnes

FOREIGN PATENT DOCUMENTS

CN    201024221 Y    2/2008
CN    103741173 A    4/2014
(Continued)

OTHER PUBLICATIONS

Extended European Search Report for European Patent Application No. 16872674.3 dated Apr. 25, 2019 (7 pages).
(Continued)

*Primary Examiner* — Brian W Cohen
(74) *Attorney, Agent, or Firm* — Kratz, Quintos & Hanson, LLP

(57) ABSTRACT

Provided are a novel electrode device capable of simultaneously solving a problem of sludge coat covering an anode surface, and a problem of increase in the inter-electrode distance between the anode and cathode, and a method for manufacturing a metal foil using the same.
Disclosed is an electrode device, used while being immersed in an electroconductive liquid, the electrode device comprising: a barrel which has an outer wall having plural through holes and can store a metal soluble in the liquid during current application; a shaft passing through the inside of the barrel and having a peripheral surface to which current can be applied; and a metal introducing portion for introducing the metal into the barrel, wherein the barrel rotates on its axis. The barrel is preferably provided with plural partition walls each extending inward from the outer wall and having a gap with respect to the peripheral surface of the (Continued)

shaft, and plural chambers separated in the peripheral direction of the shaft by the plural partition walls.

4 Claims, 7 Drawing Sheets

(51) Int. Cl.
*C25D 21/14* (2006.01)
*C25D 1/00* (2006.01)
*H01M 4/66* (2006.01)
*C25D 17/10* (2006.01)
*C25D 5/18* (2006.01)
*C25D 17/20* (2006.01)
*H01M 4/1395* (2010.01)

(52) U.S. Cl.
CPC ............ *C25D 17/12* (2013.01); *C25D 17/20* (2013.01); *H01M 4/66* (2013.01); *H01M 4/667* (2013.01); *C25D 21/14* (2013.01); *H01M 4/1395* (2013.01); *Y02E 60/13* (2013.01)

(56) References Cited

FOREIGN PATENT DOCUMENTS

| CN | 104620422 A | 5/2015 |
| CN | 105063730 A | 11/2015 |
| EP | 1826294 A1 | 8/2007 |
| JP | S50-2378 B1 | 1/1975 |
| JP | S53-34633 A | 3/1978 |
| JP | S58-87872 U | 6/1983 |
| JP | S61-201799 A | 9/1986 |
| JP | S61207587 A | 9/1986 |
| JP | S63-20497 A | 1/1988 |
| JP | 103120562 U | 12/1991 |

OTHER PUBLICATIONS

International Search Report for International Application No. PCT/JP2016/077931 dated Dec. 6, 2016 (2 Sheets).
Office Action of Chinese Patent Application No. 201680071631.X dated Aug. 1, 2019 (5 sheets).
Office Action pursuant to Article 94(3) EPC of European Patent Application No. 16872674.3 dated Dec. 11, 2019 (5 sheets).

[Fig. 1]
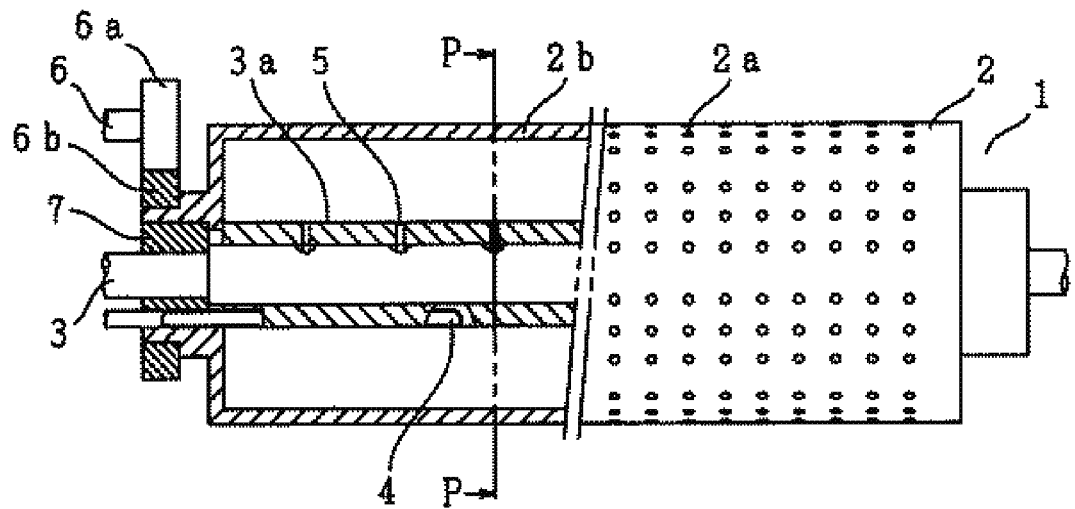
[Fig. 2]
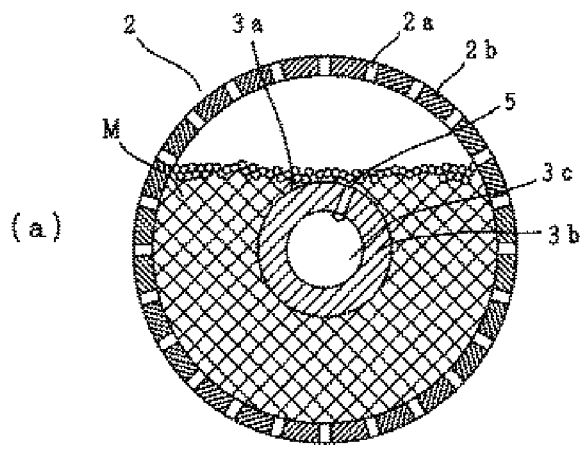
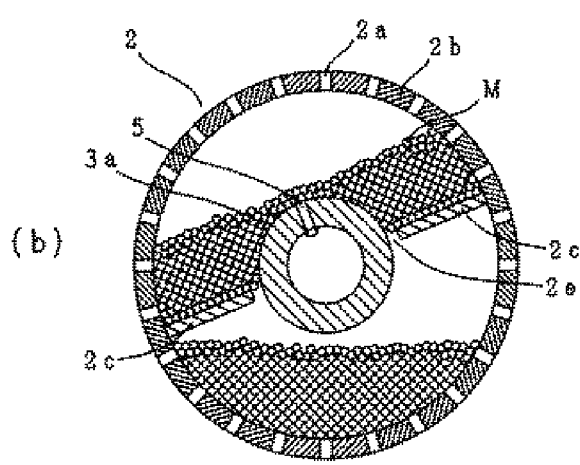

[Fig. 3]
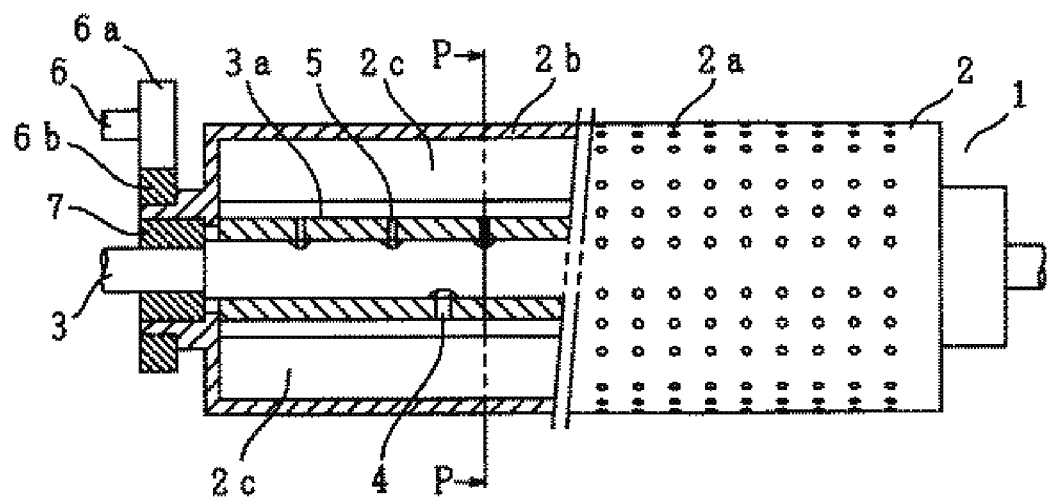
[Fig. 4]
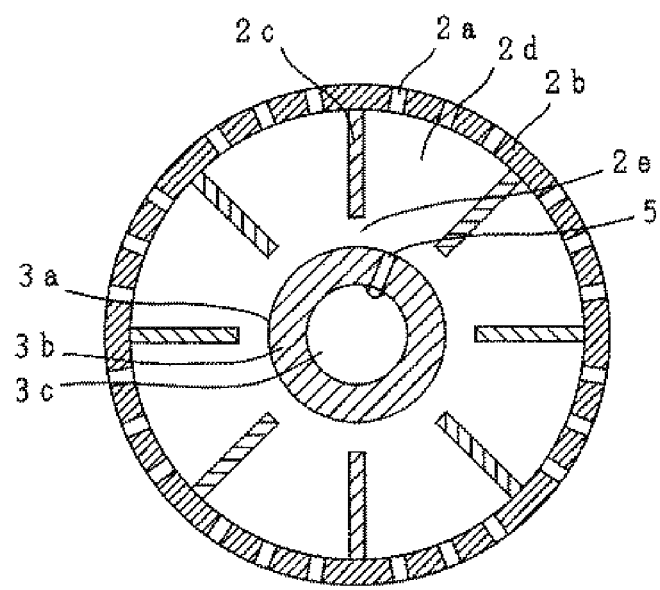

[Fig. 5]
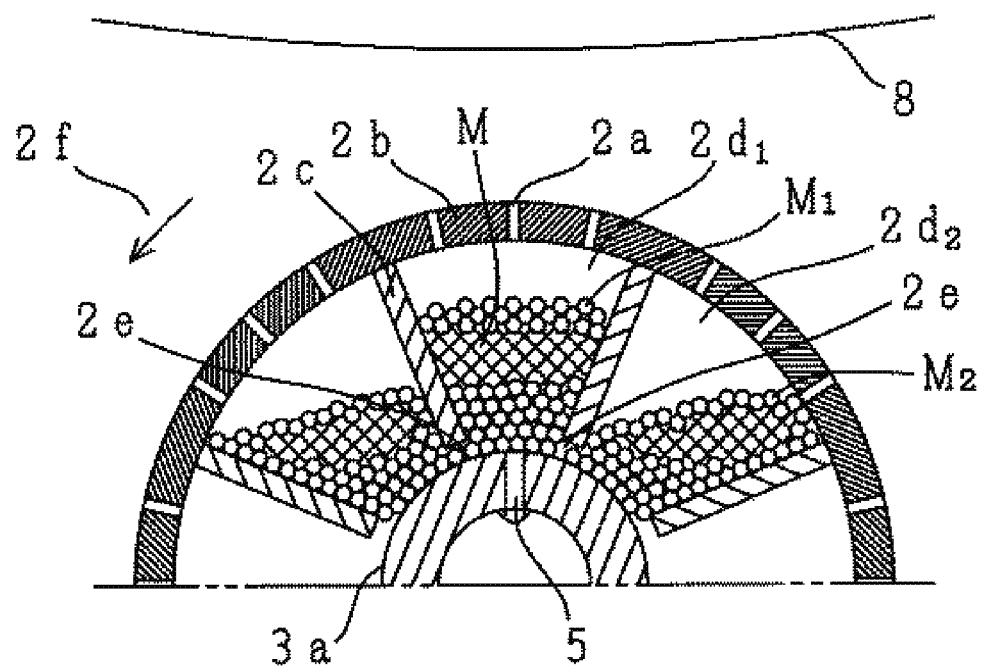
[Fig. 6]
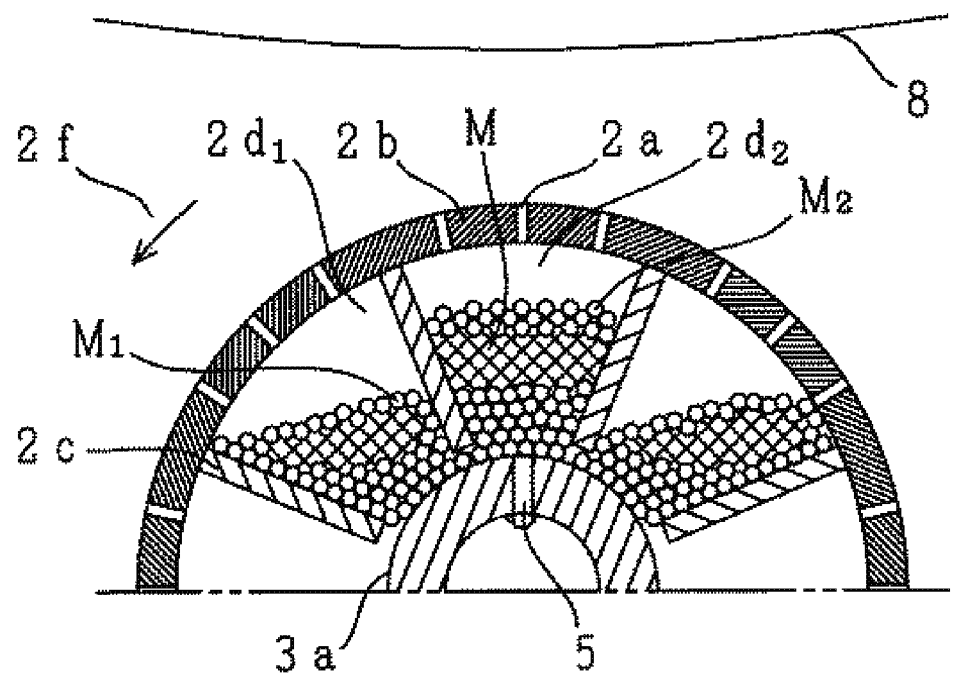

[Fig. 7]
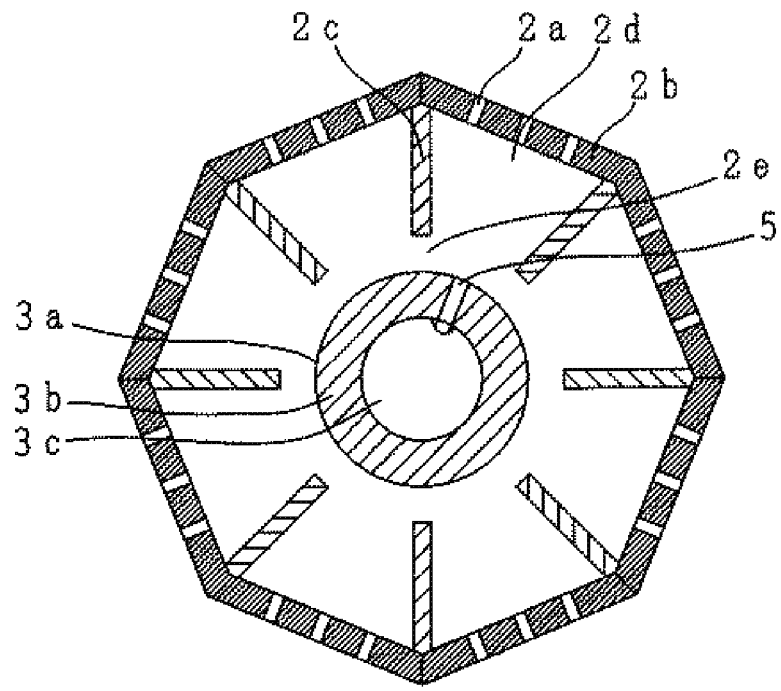
[Fig. 8]
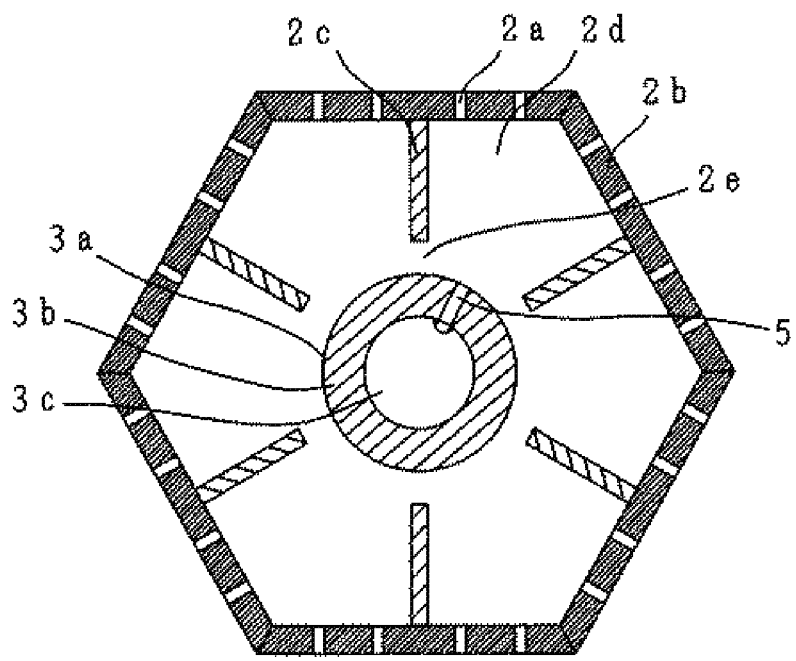

[Fig. 9]
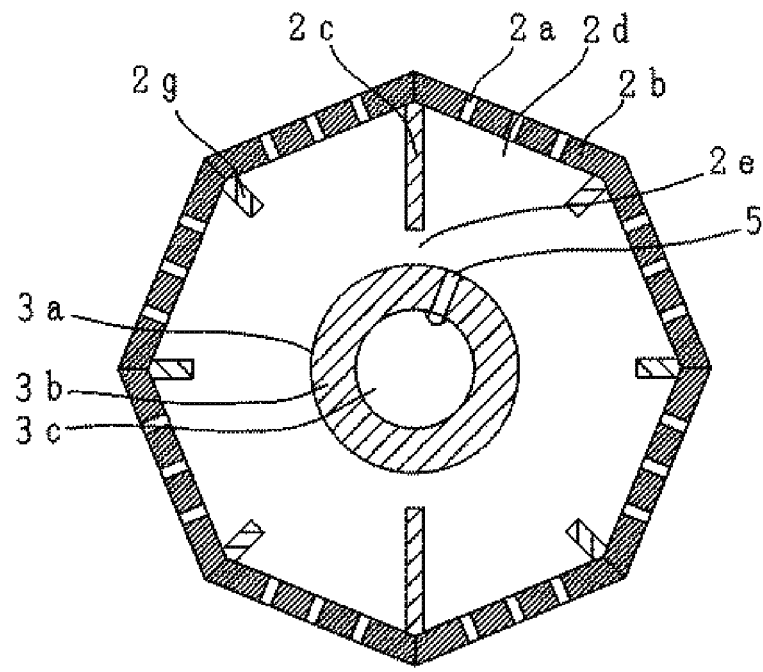
[Fig.10]
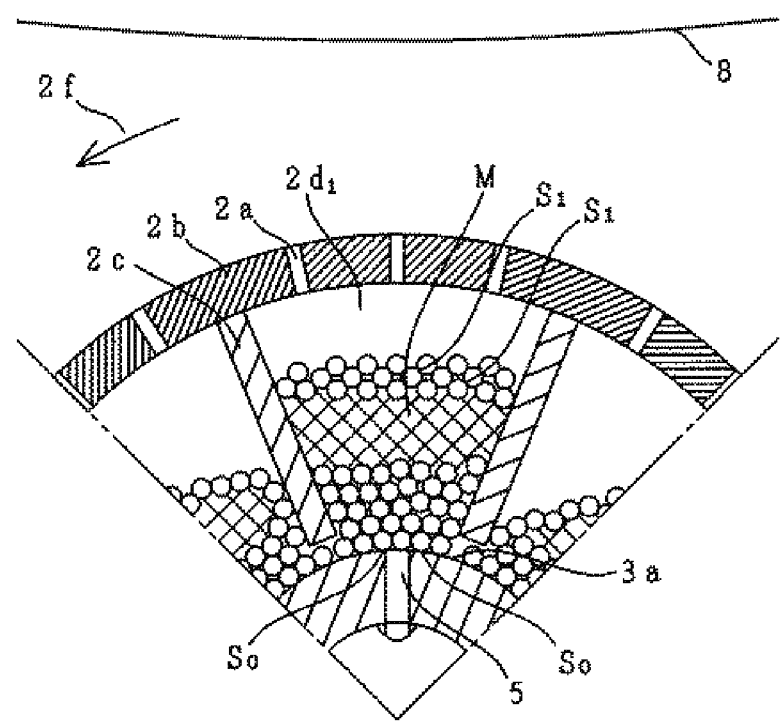

[Fig.11]
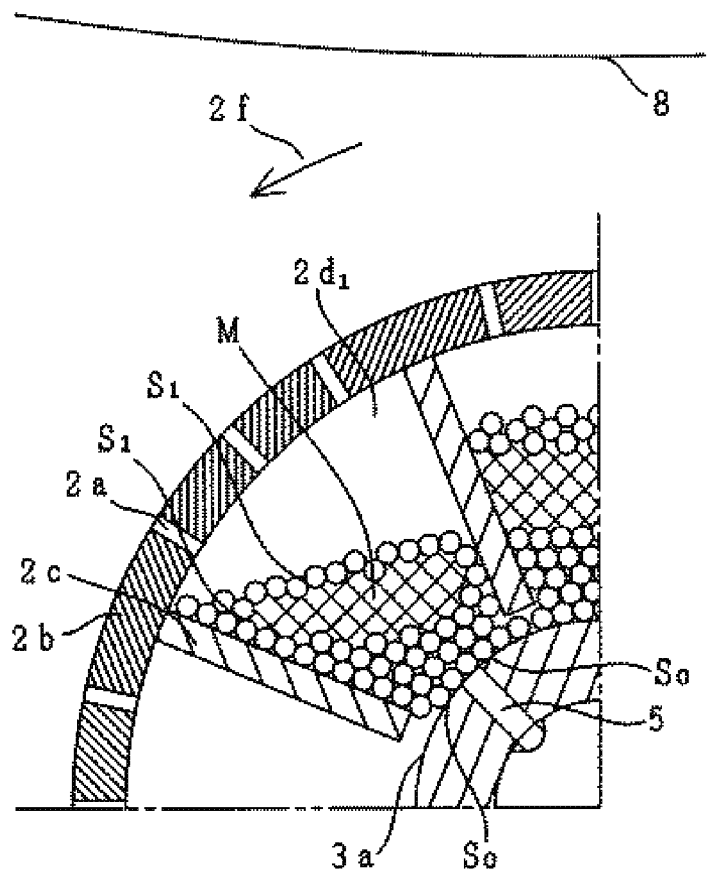
[Fig.12]
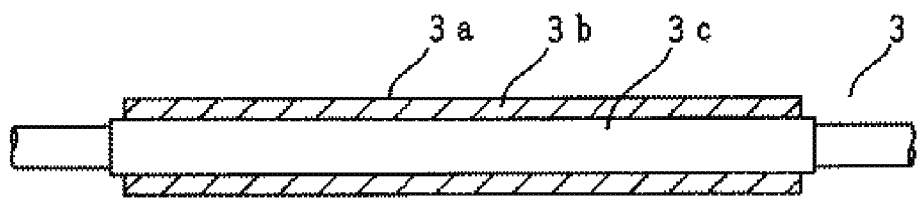
[Fig.13]
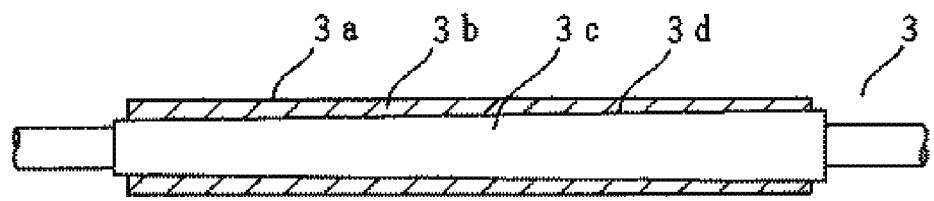

[Fig.14]
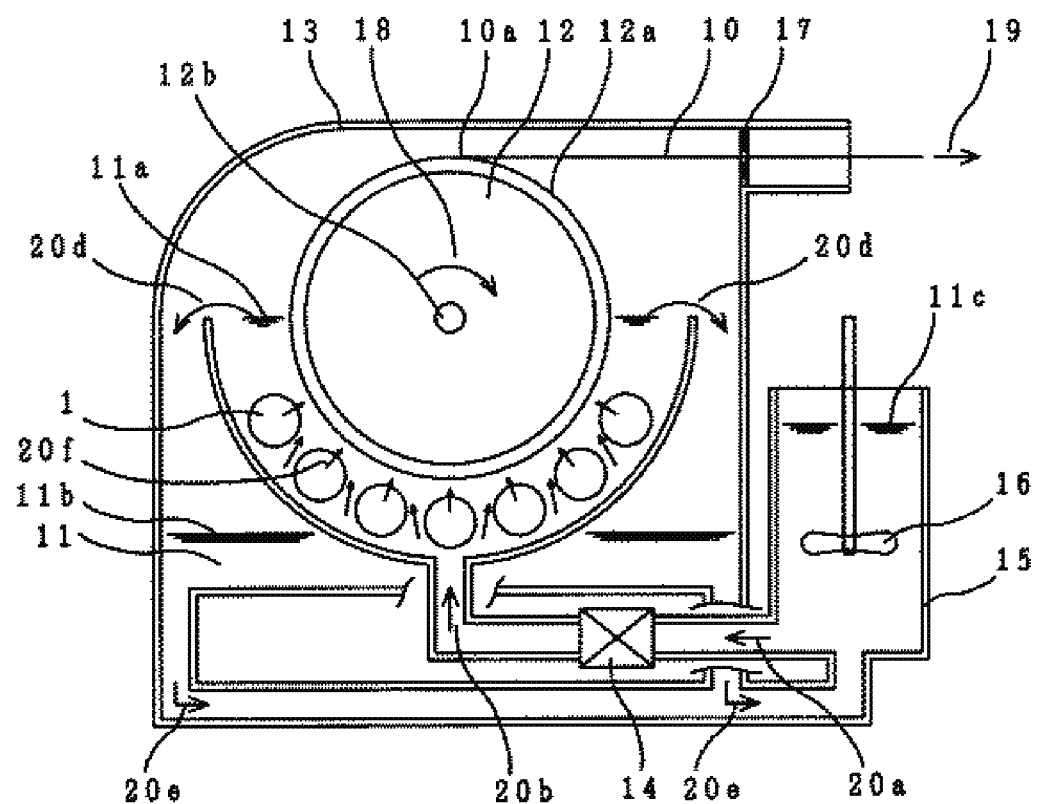

ELECTRODE DEVICE AND METAL FOIL MANUFACTURING METHOD USING SAME

TECHNICAL FIELD

The present invention relates to an electrode device and a method for manufacturing a metal foil using the same.

BACKGROUND ART

For a collector for an electrical storage device such as a lithium ion secondary battery and a supercapacitor (electrical double-layer capacitor, redox capacitor, lithium ion capacitor, etc.), a copper foil (Cu foil) or an aluminum foil (Al foil) are used, for example. A Cu foil is manufactured by a rolling process or an electroplating process (electroforming process, electrolytic process). Although such an Al foil has been manufactured only by a rolling process, application of an electroplating process is currently being studied. Such an electroplating process is a process in which current is applied between a soluble or insoluble metal (anode) and a peripheral surface of a drum (cathode) which are immersed in a liquid (plating liquid) to form a metal film (plating film) containing a component of the metal to be an anode on the peripheral surface of the drum to be a cathode.

In the above electroplating process, a soluble metal (anode) is dissolved into a liquid as metal ions during current application, and the surface becomes coated with a coat (sludge coat) which is considered as an oxide with progress of the dissolution. Also in the case of an insoluble metal, an oxidation reaction occurs on a surface of the metal (anode) in the liquid, and the surface becomes coated with a similar sludge coat made of the reaction product. The metal (anode) coated with the sludge coat is prevented from being dissolved into the liquid, and therefore is not preferred. Thus, for the purpose of suppressing production of the sludge coat, for example, Patent Document 1 proposes an electrode device (anode for electroplating) having a configuration in which a soluble metal plate is interposed between a prism-shaped zinc (anode) and a current-carrying body. In addition to that, for example, a means for adjusting a liquid composition so as to be suitable to the metal to be an anode (see Patent Document 2) and a means for regulating a structure of an Sn—Bi-based metal to be an anode to suppress production of sludge coat caused by Bi-substitution of Sn (see Patent Document 3) are proposed.

In addition, during current application, a metal to be an anode has a strong tendency to dissolve from the side close to a cathode (peripheral surface of a drum) having a different polarity, and therefore the distance between the anode (metal) and the cathode (peripheral surface of the drum) (inter-electrode distance) gradually increases. The increase in the inter-electrode distance is not preferred since it not only leads to increase in electrolytic voltage resulting in increase in power consumption, but also affects the thickness and quality of the metal film formed on the peripheral surface of the drum. In this situation, for the purpose of keeping the inter-electrode distance constant, for example, Patent Document 4 proposes an electrode device (electroplating device), including plural anode baskets that are movable by being attached to a rotating belt and charged with pellet-shaped metal particles (anode) and an anode baffle plate that is provided with an opening limitedly around the center and has a constant distance to a cathode (inter-electrode distance), and having such a configuration that only a predetermined anode basket is brought into contact with the anode baffle plate to allow current to flow.

Also, for example, Patent Document 5 proposes an electrode device having a configuration in which plural metal plates (anode) that are hung by a hook are arranged so as to have a constant distance to a steel plate (cathode) and a state of consumption of the metal plate and the distance to the steel plate (inter-electrode distance) are detected to perform control to remove the consumed metal plate and insert a new metal plate (anode).

PRIOR ART DOCUMENTS

Patent Documents

Patent Document 1: JP-A-62-294199
Patent Document 2: JP-A-4-333590
Patent Document 3: JP-A-2011-58076
Patent Document 4: JP-A-2009-13440
Patent Document 5: JP-A-2013-181207

SUMMARY OF THE INVENTION

Problems that the Invention is to Solve

With the progress of practical applications and sales of the aforementioned lithium ion secondary battery and the like, quality stabilization of the metal foil and cost reduction by productivity improvement are pursued strongly. Thus, improvement in technique for suppressing production of the sludge coat on the anode as described above and for appropriately removing the sludge coat, and in addition, improvement in technique regarding increasing the inter-electrode distance between the anode and cathode have become important. However, in the electrode device described in Patent Document 1, the increase in the inter-electrode distance cannot be suppressed. The means for adjusting the liquid composition (see Patent Document 2) or the means for regulating the structure of an Sn—Bi based metal (see Patent Document 3) is difficult to apply when a different material is used as the metal to be the anode or different components are incorporated in the liquid. Therefore, it is considered that such means cannot be applied to, for example, manufacturing of an Al foil (electrolysis Al foil) using a nonaqueous electrolytic solution (nonaqueous plating liquid).

Besides, in the electrode device described in Patent Document 4, since the metal particles (anode) are put and rest in the anode basket in contact with the anode baffle plate, it is considered difficult to suppress production of sludge coat on an anode surface and to appropriately remove the produced sludge coat. In this electrode device described in Patent Document 4, although a new anode basket can be inserted by moving the rotating belt at the time when sludge coat is formed on an anode surface, the anode having sludge coat produced has to be exchanged even if the anode is not fully consumed, and thus it is not practically useful from the viewpoint of the use efficiency of the anode. In addition, in the electrode device described in Patent Document 5, since the anode (metal plate) rests while being hung by a hook, it is considered difficult to appropriately conduct the aforementioned production suppression and removal of the sludge coat on the anode. Also, in this electrode device described in Patent Document 5, there are the following drawbacks: provision of a special controller for detecting and controlling the consumption state of the anode (metal plate) and the inter-electrode distance to the cathode (steel plate) is required; and the degrees of freedom about the shape and arrangement of the anode and cathode are extremely limited.

An object of the present invention is to provide a novel electrode device which has a configuration that can solve the aforementioned problem of the sludge coat covering an anode surface, and more desirably, can simultaneously solve a problem of increase in the inter-electrode distance between the anode and cathode, and to provide a novel method for manufacturing a metal foil using the same.

Means for Solving the Problems

The present inventors studies an electrode structure that can sequentially dispose or supply a metal to be an anode to a given position, and found that the above problems can be solved by employing a structure of the electrode in which the inside of a barrel is charged with an appropriate amount of a metal (metal chips, etc.) to be an anode, and causing mutual collisions of the metals (anode) by stirring the inside of the barrel, thereby arriving at the present invention.

Specifically, the electrode device of the present invention is an electrode device that is used while being immersed in an electroconductive liquid, and comprises a barrel which has an outer wall having plural through holes and can store a metal soluble in the liquid during current application, a shaft passing thorough the inside of the barrel and having a peripheral surface to which current can be applied, and a metal introducing portion for introducing the metal into the barrel, and wherein the barrel rotates on its axis.

The barrel is preferably provided with plural partition walls each extending inward from the outer wall and having a gap with respect to the peripheral surface of the shaft, and plural chambers (cells) separated in the peripheral direction of the shaft by the plural partition walls.

The barrel is preferably provided with a protrusion protruding inward from the outer wall and having a height not exceeding that of the partition wall, between the plural partition walls adjacent to each other.

In the electrode device of the present invention, the metal preferably has a spherical shape.

In addition, the shaft preferably comprises an outer cylinder having the peripheral surface and an axis body to which the outer cylinder is attached.

The attachment of the outer cylinder to the axis body is preferably achieved by a taper structure.

The above electrode device of the present invention can be used for manufacturing a metal foil, such as an Al foil, by an electrolytic process. That is, the method for manufacturing a metal foil of the present invention is a method in which: in an electroconductive liquid, an electrode device of the present invention in which a metal soluble in the liquid during current application is stored and apart of a peripheral surface of a drum having a different polarity from that of the electrode device are immersed; while rotating the barrel of the electrode device on its axis and also rotating the drum on its axis in one direction, current is applied between the peripheral surface of the drum and the peripheral surface of the shaft of the electrode device to electrodeposit a metal film containing a component of the metal on the peripheral surface of the drum; and the metal film is peeled from the peripheral surface of the drum, thereby forming a metal foil.

It is preferred that the method for manufacturing a metal foil of the present invention comprises a process for introducing the metal into the barrel of the electrode device during current application.

It is also preferred that the barrel of the electrode device is intermittently rotated.

The metal may contain 97% by mass or more of aluminum.

Effects of the Invention

According to the present invention, during current application, a sludge coat produced on a surface of the anode is appropriately removed, and substantial variation in the inter-electrode distance between the anode and cathode is suppressed. Accordingly, by using the electrode device of the present invention, a healthy and continuous manufacture of a metal foil by an electrolytic process is made possible.

BRIEF DESCRIPTION OF THE DRAWINGS

FIG. 1 shows a configuration example of an electrode device of the present invention with a part thereof illustrated by an axial cross section.

FIG. 2 (a) is a cross sectional view showing a cross section of an axis taken along the line PP illustrated in FIG. 1 in a state where a metal is stored inside a barrel. FIG. 2 (b) shows a configuration example in which partition walls are provided inside the barrel shown in FIG. 2 (a).

FIG. 3 shows another configuration example of an electrode device of the present invention than FIG. 1 with a part thereof illustrated by an axial cross section.

FIG. 4 is a cross sectional view showing a cross section of an axis taken along the line PP illustrated in FIG. 3.

FIG. 5 is a cross sectional view showing a state where the inside of the barrel shown in FIG. 4 is charged with a metal to be an anode.

FIG. 6 is a cross sectional view showing a state after the barrel is rotated forward from the position shown in FIG. 5 by an angle corresponding to one chamber.

FIG. 7 is a cross sectional view showing a configuration example of a cross section of an axis of a barrel applicable to the present invention.

FIG. 8 is a cross sectional view showing a configuration example of a cross section of an axis of a barrel applicable to the present invention.

FIG. 9 is a cross sectional view showing a configuration example of a cross section of an axis of a barrel applicable to the present invention.

FIG. 10 is a cross sectional view showing a vicinity of one chamber shown in FIG. 4 being enlarged.

FIG. 11 is a cross sectional view showing a state after the barrel is rotated forward from the position shown in FIG. 10 by an angle corresponding to one chamber.

FIG. 12 shows a configuration example of a shaft with a part thereof illustrated by an axial cross section.

FIG. 13 is a cross sectional view showing a configuration example of a shaft having another axial cross section than FIG. 12.

FIG. 14 shows a configuration example of an apparatus for manufacturing a metal foil using an electrode device of the present invention.

MODE FOR CARRYING OUT THE INVENTION

The electrode device of the present invention will be described in detail with reference to the drawings as needed.

FIG. 1 shows a configuration example of the electrode device of the present invention with a part thereof illustrated by the axial cross section, and FIG. 2 (a) shows a cross section of an axis taken along the line PP illustrated in FIG. 1 in a state where a metal M is stored inside a barrel 2, and FIG. 2(b) shows a configuration example in which partition walls 2c are provided inside the barrel 2 as shown in FIG. 2(a). Incidentally, although the cross section of the axis of the barrel 2 as shown in FIG. 2 has a circular shape, the shape may be a polygonal shape, such as a hexagonal shape and an octagonal shape, as described later. In addition, FIG. 3 shows another configuration example of the electrode device of the present invention than the configuration as shown in FIG. 1 with a part thereof illustrated by the axial cross section, and FIG. 4 shows the cross section of the axis taken along the line PP illustrated in FIG. 3. In a configuration example as shown in FIG. 4, a state where the inside of the barrel 2 is charged with a metal M to be an anode is shown in FIG. 5, and a state after the barrel 2 is rotated from the position as shown in FIG. 5 by an angle corresponding to one chamber is shown in FIG. 6. Incidentally, the metal M illustrated in each drawing referred herein is generally omitted by using hatching for simplicity, and only a part thereof is illustrated as individual metals.

An electrode device 1 as shown in FIG. 1 and an electrode device 1 as shown in FIG. 3 (hereinafter, sometimes collectively referred to as "electrode device 1") have a resistance to an electrolytic solution so that the devices can be used while being immersed therein. The electrode device 1 includes the barrel 2 that has an outer wall 2b having plural through holes 2a and can store the metal M soluble in the electrolytic solution during current application, a shaft 3 passing through the inside of the barrel 2 and having a peripheral surface 3a to which current can be applied, and a metal introducing portion 4 for introducing the metal M into the barrel 2. The electrode device 1 includes inside the barrel 2 a liquid introducing portion 5 for ejecting an electrolytic solution. The liquid introducing portion 5 of the electrode device 1 as shown in FIG. 2 and FIG. 4 is configured to pass through the inside of the shaft 3 (not shown) and to be provided with an opening in the peripheral surface 3a, and this configuration is preferred since it allows the metal M to efficiently flow as described later. The metal introducing portion 4 is also configured to pass through the inside of the shaft 3 (not shown) and to be provided with an opening in the peripheral surface 3a, and this configuration is preferred since the metal M (individual metals) can be introduced into the barrel 2 from an appropriate position in the axial direction of the barrel. Incidentally, the metal introducing portion 4 may have, besides the above configuration, for example, a configuration in which an opening is provided in a pipe or the like embedded in a groove formed in the peripheral surface 3a of the shaft 3 (see FIG. 1) or a configuration in which an opening is provided in the side wall of the barrel 2 on the side of the peripheral surface 3a of the shaft 3.

The barrel 2 is joined to a driving axis 6 for rotating the barrel 2 via gears 6a and 6b at one end thereof, and is positioned with respect to the shaft 3 at a sliding portion 7 so that the barrel 2 can be rotated on its axis. Incidentally, an operation or a state of the barrel 2 rotating around the longitudinal direction of the inside thereof (for example, the axial direction of the shaft 3) is referred to as rotation of the barrel 2 on its axis, and the driving axis for the rotation of the barrel on its axis may be provided at both ends of the barrel. The shaft 3 support the barrel 2 by the sliding portion 7 so that the barrel can rotate freely, and, although the illustration is omitted, may be fixed at both ends thereof or pivotally supported at both ends thereof so that it can rotate freely. Incidentally, when the configuration in which the shaft 3 rotates on its axis is employed, a difference in the rotation speed is preferably provided between the shaft 3 and the barrel 2.

As the barrel 2 as shown in FIG. 2 (b), the barrel in the present invention is provided with one or more partition walls 2c each extending inward from the outer wall 2b and having a gap with respect to the peripheral surface 3a of the shaft 3. With this configuration, the inside space of the barrel 2 can be partitioned. In this case, as the barrel 2 as shown in FIG. 4, the barrel is preferably provided with plural partition walls 2c each extending inward from the outer wall 2b and having a gap with respect to the peripheral surface 3a of the shaft 3, and plural chambers 2d separated in the peripheral direction of the shaft 3 by the plural partition walls 2c. By providing the partition walls 2c each having a gap with respect to the peripheral surface 3a of the shaft 3 as the barrel 2 as shown in FIG. 2(b) or FIG. 4, plural metals M (individual metals) stored inside the barrel 2 are moved to be stirred by the partition walls 2c, and therefore the plural metals M (individual metals) can be allowed to flow in an efficient manner. When the barrel rotates on its axis, as shown in FIG. 2(b) and FIG. 5, the partition walls 2c move upward while keeping an appropriate amount of the metals M (individual metals). Accordingly, an appropriate amount of the metals M to be an anode can be disposed nearer the cathode to enhance the electrolysis efficiency.

The plural metals M (individual metals) can be stored inside the barrel 2 as shown in FIG. 2(b) or in the plural chambers 2d inside the barrel 2 as shown in FIG. 4, as shown in FIG. 5. Incidentally, the metals M (individual metals) are put in the barrel 2 so that the total amount of the metals becomes an appropriated amount with respect to the total volume of the barrel 2 before current application. In the case of the electrode device 1 as shown in FIG. 4, the number of the chambers 2d provided in the barrel 2 is 8. In the chamber 2d in the barrel 2 positioned above the shaft 3, some of the individual metals (metals M) can be deposited on and brought into contact with the peripheral surface 3a of the shaft 3 (see FIG. 5). Accordingly, when a current is applied to the peripheral surface 3a of the shaft 3 in this state, a current can also be applied to the metals M in the chambers 2d, and therefore the individual metals (metals M) put in the chamber 2d in the barrel 2 can be allowed to act as an anode. This point will be described in detail later.

In the electrode device of the present invention, when the barrel rotates on its axis, the metals M (individual metals) stored inside the barrel in an appropriate amount are allowed to move and flow, and mutual collisions occur between adjacent individual metals. When the mutual collisions between individual metals occur during current application, the surfaces of the individual metals M which have become an anode are made into surfaces on which the produced sludge coat can be appropriately removed and which can uniformly react in a fresh state. Thus, according to the electrode device of the present invention, it is possible to solve the aforementioned problem of the sludge coat covering an anode surface.

In addition, a preferred configuration which makes it possible to achieve more efficient flow of the individual metals (metals M) as described above is an electrode device having a cross sectional structure as shown in FIG. 4, FIG. 7, FIG. 8, and FIG. 9. For example, in the electrode device 1 as shown in FIG. 4, when the barrel 2 rotates on its axis and a difference in rotation speed occurs between the shaft 3 and the barrel 2, the plural partition walls 2c provided in the barrel 2 then rotate around the peripheral surface 3a of the shaft 3. For this reason, the individual metals put inside the chambers 2d are allowed to move so as to be stirred by the partition walls 2c, and mutual collisions occur between adjacent individual metals. Accordingly, by the mutual collisions occurring during current application, the surfaces of the individual metals M which have become an anode are made into surfaces on which the produced sludge coat can be appropriately removed and which can uniformly react in a fresh state.

Now, the individual metals which have become an anode inside the barrel are dissolved by an electric field generated by the current application (hereinafter, referred to as "electrolysis"), and the volume is gradually reduced. For this reason, the inter-electrode distance of the metals M to be an anode and the cathode is widened in a degree corresponding to the volume reduction of the individual metals. Then, when the electrolysis of the metal M further proceeds to excessively reduce the volume, the shaft 3 (peripheral surface 3a) itself may be possibly electrolyzed due to the electric field reaching the shaft 3 or due to exposure of the peripheral surface 3a of the shaft 3. Thus, in the electrode device of the present invention, by providing the metal introducing portion for introducing the metal M (individual metals) into the barrel, it is made possible to introduce and replenish the metal M (individual metals) into the barrel during current application. With the metal introducing portion, since the metal M can be introduced into the barrel 2 at an appropriate time, it is possible to suppress the aforementioned widening of the inter-electrode distance and to also prevent the electrolysis of the shaft 3 (peripheral surface 3a) itself.

Incidentally, in such introduction of the metal M, taking into account the efficiency of sludge coat removal on the metal M and the efficiency of contact point formation, relative to the state where all the volume inside the barrel 2 is charged with the metal M (charging rate 100%), the introduction is preferably controlled to give an appropriate volume (for example, in the range of 70% to 95%). As specific examples, the charging rate is within the range of 70% to 80% to increase the void space when giving weight to the sludge coat removal, and the charging rate is within the range of 85% to 95% to increase the total amount of the metal M when giving weight to the contact point formation. When the both are appropriately balanced, an appropriate charging rate is preferably selected from the range of 75% to 90%. According to the electrode device of the present invention having such configuration, it is possible to solve the problem of the sludge coat covering an anode surface as described above, and to simultaneously solve the problem of increase in the inter-electrode distance between the anode and cathode.

In addition, in the electrode device 1 having the cross sectional structure in which the inside of the barrel 2 is partitioned by the plural chambers 2d as shown in FIG. 4, the metal M (individual metals) is most reduced in the volume in the chamber 2d that is positioned nearest to the cathode, and the inter-electrode distance to the cathode is more widened than the other chambers 2d by the degree corresponding to the more volume reduction of the individual metals. For example, in the chamber 2d positioned nearest to the cathode, the metals M which are soluble in the electrolytic solution during current application are deposited on the peripheral surface 3a which is provided on the shaft 3 and to which current can be applied, and the individual metals are brought into a contact state. When current is applied in this contact state, a current is applied from the peripheral surface 3a of the shaft 3 to the individual metals, and electrolysis of the surface of the individual metals on the side nearest to the cathode is more liable to proceed and the individual metals are more liable to be reduced in the volume.

The aforementioned problem of the volume reduction of the individual metals in the electrode device 1 having the cross sectional structure as shown in FIG. 4 can be solved by each chamber 2d in the electrode device 1 moving forward in the rotation direction by the rotation of the barrel 2 on its axis with respect to the shaft 3. Specifically, a chamber $2d_1$ as shown in FIG. 5 moves forward from a position on the side nearest to the surface of the cathode 8 by rotation of the barrel 2 shown by an arrow 2f, and a next chamber $2d_2$ is positioned on the side nearest to the surface of the cathode 8 as shown in FIG. 6. Thus, in place of a metal $M_1$ in the chamber $2d_1$ which has been reduced in the volume, a metal $M_2$ in the next chamber $2d_2$ which has undergone substantially no reduction in the volume in comparison with the metal $M_1$ can be positioned on the side nearest to the surface of the cathode 8, whereby the problem can be solved. Accordingly, by adopting the electrode device 1, during current application, the substantial variation in the inter-electrode distance, between the surface of the metals M to be an anode on the side nearest to the cathode and the surface of the cathode 8, can be suppressed.

As for the aforementioned volume reduction due to electrolysis of the individual metals (metals M) inside the barrel in the present invention, by providing plural through holes in the outer wall of the barrel, the individual metals having a small surface area whose size is reduced, due to electrolysis, into a size less than the through hole size by consumption can be naturally discharged from the through holes by the force of gravity or the like. For example, in the electrode device 1, since plural through holes 2a are provided in the outer wall 2b of the barrel 2, individual metals having a reduced size can be naturally discharged from the through holes 2a. Upon the reduction in amount of the individual metals (metals M) by the consumption and the discharge as described above, new metals M (individual metals) can be supplied from the metal introducing portion into the barrel while controlling the amount to correspond to the reduced amount.

The above control for the metal M is, for example, in the electrode device 1, preferably performed in a manner that the number of the openings of the metal introducing portion 4 to the peripheral surface 3a of the shaft 3 is one or plural, and furthermore that, when the chamber 2d in the barrel 2 is positioned on the lower side, new metals M (individual metals) are introduced into the chamber 2d. When the chamber 2d in the barrel 2 is positioned on the lower side, the metals M (individual metals) in the chamber 2d move toward the outer wall 2b side and are deposited, and thereby a moderate void space is formed around the opening of the metal introducing portion 4. Therefore, the introduction of the metals M from the opening is not inhibited. With such a configuration having the metal introducing portion 4, the volume of the metal M stored in the chamber 2d can always be easily kept in a stable state. Incidentally, the supply of new metals M (individual metals) is preferably performed at a position that is not close to the cathode where the influence of the current application hardly reaches.

In the present invention, taking into account various conditions such as, for example, the shape, size, and mass of the metals stored inside the barrel, and the properties and temperature of the electrolytic solution, it is preferred that the barrel has such a shape and size that the rotation of the barrel itself is performed most efficiently. For example, in the electrode device 1 having the cross sectional structure as shown in FIG. 4, in addition to the configuration as shown in FIG. 4 including 8 chambers with the outer wall of an cylindrical shape, the shape of the cross section of the axis of the barrel may be a polygonal shape in the outer wall, as in a configuration as shown in FIG. 7 including 8 chambers with the outer wall of an octagonal shape, a configuration as shown in FIG. 8 including 6 chambers with the outer wall of a hexagonal shape, and the like. The outer wall may have any shape in the cross section of the axis and any number of the chambers may be provided, and the barrel may have the configuration as shown in FIG. 9, that is, a configuration including one or more protrusions 2g which protrude from the outer wall 2b toward the inside of the chamber 2d and have a height not exceeding that of the partition walls 2c, between adjacent partition walls 2c inside the chamber 2d.

Such a protrusion is not limited to the protrusion 2g (a plate-like shape in a cross sectional view) as shown in FIG. 9. For example, in a cross sectional view, a shape including a polygonal shape such as trigonal, a shape including an arc or elliptic arc, a shape including a curve at the tip such as an L-, P-, and T-shape, and the like may be selected, according to the need, taking into account the number and volume of the chambers inside the barrel, the charging rate with the metals M (individual metals), the shape and the size of the individual metals, and the like. In the case of the barrel configuration including chambers, by providing such protrusions, it is possible to give further variation in the movement of the metals M (individual metals) flowing by the rotation of the barrel on its axis, and the variation in the movement further promotes stirring of the metals M (individual metals), thereby enhancing the efficiency of the sludge coat removal on the individual metals. Incidentally, the numerals in FIG. 4 are also used in FIG. 7 to FIG. 9 for convenience.

In the case of an electrode device in which the inside of the barrel is partitioned by plural chambers, the plural partition walls provided in the barrel are preferably set to an appropriate shape and number, taking into account the aforementioned various conditions. Specifically, the shape of the partition walls may be, in addition to the plate-like shape as shown in FIG. 4, a curved plate-like shape, a corrugated plate-like shape, other irregular shape, or a shape in which the above shapes are partially combined. As for the number and arrangement of the partition walls, taking into account the aforementioned various conditions, it is possible to employ a configuration as shown in FIG. 4 in which the barrel is partitioned in the peripheral direction (around the axis of the barrel 2) of the shaft 3 into 8 parts and partition walls are evenly arranged, a configuration in which the barrel is partitioned into a number less than 8 or a number more than 8, a configuration in which the barrel is partitioned so as not to give even distances between partition walls but to give the same distances, for example, for every other partition walls, or to entirely give different distances between partition walls from one another. For example, when referring to the barrel 2 as shown in FIG. 3, it is possible to arrange the partition walls, with different distances between partition walls around the axis, for example, by regulating the numbers of the partition walls between the right side and the left side in the axis direction of the barrel 2, or with different positions for attaching partition walls (phases of the partition walls) around the axis of the barrel 2 between the right side and the left side. In addition, the arrangement of the partition walls with respect to the outer wall viewed in the cross section of the axis may be a vertical arrangement with respect to the outer wall, or an inclined arrangement around the axis, or an arrangement in which the phase gradually varies in the axial direction, for example, as in a cross section of an axis of a spiral shape, taking into account the aforementioned various conditions.

Next, in the electrode device 1 having the cross sectional structure as shown in FIG. 4, behavior of the metals M stored in an appropriate amount in the chamber 2d when the barrel 2 rotates on its axis will be described with reference to the drawings. FIG. 10 and FIG. 11 show enlarged views of the vicinity of the chamber $2d_1$ and the chamber $2d_2$ of the barrel 2 as shown in FIG. 5 and FIG. 6. Incidentally, the numerals in FIG. 5 and FIG. 6 are also used in FIG. 10 and FIG. 11 for convenience.

In the inside of the chamber $2d_1$ as shown in FIG. 10 positioned, for example, above the shaft 3 of the barrel 2, the individual metals constituting the metal M come in contact with each other by their own weights to form contact points S (hereinafter, represented by a contact point $S_1$ as shown in FIG. 10), and some of the individual metals come in contact with the peripheral surface 3a of the shaft 3 to form contact points S (hereinafter, represented by a contact point $S_0$ as shown in FIG. 10). With the contact point $S_1$ between the individual metals and the contact point $S_0$ between the individual metals in contact with the peripheral surface 3a and the peripheral surface 3a as described above, a configuration, in which electrical connection is continuously made to the individual metals on the side most distant from the peripheral surface 3a, that is, on the side nearest to the cathode 8, via the contact points S, can be made. In this state, when electrical energy is supplied via the peripheral surface 3a of the shaft 3, electrical energy can be supplied to all the individual metals in the chamber $2d_1$ in the barrel 2 via the contact points S.

Also, during current application, when the chamber $2d_1$ is moved to the position as shown in FIG. 11 by the rotation of the barrel 2 on its axis, the individual metals (metals M) in the above state continuously change their positions by flowing in the chamber $2d_1$ by the inclination due to the rotation, thereby being stirred. However, the individual metals are in contact with each other on their surfaces due to their own weights, and therefore can continuously change their positions while rubbing the surfaces thereof each other. For this reason, even if the individual metals are distanced by stirring, the contact point $S_1$ between the individual metals can be reformed immediately after that. The reformation of the contact point occurs also for the contact point $S_0$ with the peripheral surface 3a. Incidentally, when the individual metals have a spherical shape, in other words, spherical metals are used as the metal M, the individual metals are apt to come in contact equally with each other, and the formation of the contact points S (contact point $S_1$, contact point $S_0$) is more securely and stably achieved, and therefore such a shape is preferred.

For the rotation driving (rotation operation) of the barrel 2 on its axis, continuous driving or intermittent driving can be applied. In the case of intermittent driving, intermittent rotation in which rotation and rest are alternately repeated every prescribed time or periodic rotation in which rotation and rest of several seconds to several minutes are alternately repeated may be applied. When the barrel 2 is driven so as to perform such a rotation operation on its axis, the metals M can be appropriately stirred inside the barrel 2 in any of the aforementioned driving patterns. In addition, the intermittent driving of the barrel 2 is preferred, and during the barrel 2 which alternately repeats rotation and rest rests, the contact points formed between the metals M (individual metals) that have settled and are at rest are more stabilized. Incidentally, the down-time of the barrel 2 in the intermittent driving is preferably set to be long unless it impairs the removal of the sludge coat.

A trial was performed for evaluating effectivity of the intermittent driving of the barrel 2 as described above. Specifically, by using the barrel 2 (the length was 750 mm, the inner diameter was 110 mm, the thickness of the outer wall 2b was 1.5 mm, and the outer diameter of the peripheral surface 3a was 70 mm) having a structure including the outer wall 2b of an octagonal shape, two chambers 2d formed by two partition walls 2c, and the protrusions 2g provided at three points of each chamber 2d as shown in FIG. 9, while changing the charging rate with the metals M among some values within the range of 70% to 95%, the rotation of the barrel 2 on its axis was performed by an intermittent driving or a continuous driving, thereby conducting the trial. As a result, the electrolysis voltage in the intermittent driving relative to that in the continuous driving was reduced by about 10% at the downtime, about 2% at the beginning of the rotation on its axis, and about 5% at the stable rotation on its axis. Incidentally, in such a trial, the shaft 3 was allowed to rest, the rotation number of the barrel 2 was set to 3 rpm, and the conditions of blending and electrolysis of the electrolytic solution was set to be the same (the applied current density was set to 100 mA/cm$^2$, the flow rate as measured at the liquid introducing portion 5 was set to 25 L/min, and the electrolytic solution temperature was set to 100° C.), except for the driving pattern of the barrel 2. In the intermittent driving, a pattern in which the rest for 5 minutes and the rotation for 40 seconds were alternately repeated, and a pattern in which the rest for 10 minutes and the rotation for 2 minutes were alternately repeated were used. It was found from the results of the trial that the intermittent driving is a preferred driving of the barrel 2 (rotating operation) and the effect of reducing the electrolysis voltage can then be obtained.

In addition, during stirring, on the surface of the metals M (individual metals) positioned on the side nearest to the cathode 8, the sludge coat due to electrolysis is liable to be formed as described above. However, since the metals M (individual metals) rub the surfaces thereof each other by their own weights, even if the sludge coat is formed on the surface thereof, it is removed by the rubbing. At this time, the individual metals are preferably in a spherical shape, in other words, spherical metals are preferably used as the metal M. Since the individual metals are apt to come in contact equally with each other owing to the spherical shape thereof, the removal of the sludge coat is more securely and stably achieved. Accordingly, during current application, the surfaces of the individual metals to be an anode are kept in a substantially fresh state, and the electric energy between the metals M (individual metals) is stably conducted via the contact points $S_1$. Incidentally, the sludge coat removed from the surface of the metal M (individual metals) (sludge residue) is naturally discharged from the plural through holes 2a provided in the outer wall 2b of the barrel 2 as described above. At this time, when the electrolytic solution is ejected from the liquid introducing portion 5 into the barrel 2, the inside of the chamber 2d is stirred by the electrolytic solution and the discharge of the sludge residue is promoted.

In the case of a configuration in which new metals M (individual metals) can be supplied into the barrel 2 during current application as described above, the fresh and non-consumed individual metals coexist with the individual metals that are being consumed by electrolysis, and the metals M as a collection of individual metals having different sizes (hereinafter, referred to as "metals M in the normal state") are stored in the barrel 2. The flow of the metals M (individual metals) in the normal state occurring by stirring as described above contributes to keeping the metal ion concentration in each chamber 2d in a homogeneous state. Since each chamber 2d is provided with the partition walls 2c each having a gap 2e with respect to the peripheral surface 3a of the shaft 3, the metals M (individual metals) in the normal state can also flow thorough the gap 2e into another adjacent chamber 2d by the rotation of the barrel 2. Incidentally, the size of the gap 2e is preferably set to a size of a degree that can suppress an excessive flow of the individual metals to another adjacent chamber 2d (for example, approximately from 1.1 times to 2.5 times the average particle size of the non-electrolyzed individual metals) so that an appropriate amount of the metal M is stored inside the chamber $2d_1$, for example, when assuming the inside of the chamber $2d_1$ positioned on the upper side as shown in FIG. 10. Accordingly, the inside of the barrel 2 in which the metals M in the normal state are stored in each chamber 2d is also kept in the state where the metal ion concentration is homogeneous as a whole. Incidentally, when the individual metals have a spherical shape, in other words, spherical metals are used as the metal M, the individual metals easily pass through the gap 2e, the flow as described above is more securely and stably achieved, and therefore such a shape is preferred.

At this time, for example, a configuration in which an electrolytic solution is ejected from the liquid introducing portion 5 which opens to the peripheral surface 3a of the shaft 3 toward the inside of the barrel 2 is preferred. The electrolytic solution ejected from the liquid introducing portion 5 passes among the individual metals (metals M) inside the chamber 2d to be ejected out of the barrel 2. At this time, the passing electrolytic solution allows the metals M stored inside the chamber 2d to flow to be stirred. By this, the homogeneity of the metal ion concentration is promoted and the electrolytic solution is ejected from the plural through holes 2a provided in the outer wall 2b of the barrel 2, whereby formation of liquid flow of the electrolytic solution having a homogeneous metal ion concentration is promoted. For example, it is preferred that the number of the openings of the liquid introducing portion 5 to the peripheral surface 3a of the shaft 3 is one or plural, and furthermore that a control is performed in a manner that new electrolytic solution is introduced, during current application, always or when the chamber 2d of the barrel 2 is positioned on the upper side. In the case where the chamber 2d of the barrel 2 is positioned on the upper side, the metals M (individual metals) in the chamber 2d move toward the peripheral surface 3a side of the shaft 3 and are deposited, and thereby the electrolytic solution introduced from the opening securely passes through the voids among the metals M (individual metals). By having such a configuration including the liquid introducing portion 5 and ejecting the electrolytic solution from the liquid introducing portion 5, for example, into the chamber $2d_1$ as shown in FIG. 5 or FIG. 10, it is possible to eject the electrolytic solution having a homogeneous metal ion concentration from the plural through holes $2a_1$ to the outside of the barrel 2, and furthermore, to form a liquid flow toward the cathode 8. When the electrode device 1 of the present invention having such a configuration is used as an anode, a liquid flow of the electrolytic solution having a homogeneous metal ion concentration is supplied to the cathode 8, and therefore a stable electrolysis process can be carried out.

Furthermore, for example, in the case of a configuration example in which the barrel 2 is disposed below the cathode 8, the metals M stored in the chamber 2d of the barrel 2 are most liable to be electrolyzed inside the chamber $2d_1$ positioned above the shaft 3 as shown in FIG. 10. Accordingly, the peripheral surface 3a of the shaft 3 corresponding to the chamber 2d₁ is also liable to be a target of electrolysis. However, in this configuration example, the peripheral surface 3a of the shaft 3 is positioned on the most distant side from the cathode 8 and forms the contact points $S_0$ with the metals M (individual metals). Thus, the metals M positioned on the side nearer to the cathode 8 are preferentially electrolyzed, and substantial consumption of the peripheral surface 3a of the shaft 3 by electrolysis can be prevented. Incidentally, the shape of the peripheral surface 3a of the shaft 3 may be, in the cross sectional view, a circular shape as shown in FIG. 4, as well as, for example, an elliptical shape and a polygonal shape, and is preferably selected taking into consideration the relations with the gap 2e in the barrel 2 and the shape of the metals M.

In the peripheral surface 3a of the shaft 3, substantial consumption by electrolysis can be suppressed, for example, by the above configuration. However, when applying current for a long period of time, due to the aforementioned collision of metals M (individual metals) caused by stirring, or due to the gradually-proceeding electrolysis, the consumption of the peripheral surface 3a of the shaft 3 cannot be avoided. Accordingly, in the present invention, as shown in FIG. 12, the shaft 3 preferably includes an outer cylinder 3b having the peripheral surface 3a, and an axis body 3c on which the outer cylinder 3b is attached. With this configuration, when the peripheral surface 3a is consumed or damaged, it is only required to replace the outer cylinder 3b, and the axis body 3c can be reused. In addition, the outer cylinder 3b as shown in FIG. 12 has a configuration in which the attachment to the axis body 3c is achieved on the cylindrical surface, and the outer cylinder 3b more preferably has a configuration as shown in FIG. 13. Since this outer cylinder 3b has a taper structure in which the attachment to the axis body 3c is achieved on a taper surface 3d, the attachment to and release from the axis body 3c can be easily performed. The taper structure is a structure in which an outer circumference shape of the axis body 3c has a diameter increasing from one side to the other side in the axial direction, and the inner circumference shape of the 3b corresponding thereto is analogous to the outer circumference shape of the axis body 3c and has a diameter increasing from one side to the other side in the axial direction so that the outer circumference and the inner circumference engage with each other.

Next, the method for manufacturing a metal foil of the present invention using the foregoing electrode device of the present invention will be described with reference to the drawings as needed, while referring to a configuration example of an apparatus that can continuously manufacture a metal foil in which the manufacturing method is applied (hereinafter, referred to as "manufacturing apparatus").

The manufacturing apparatus as shown in FIG. 14 includes an electrolytic solution 11 which is an electroconductive liquid, a drum 12 capable of rotating on its axis, and plural electrode devices 1 that are disposed to face the peripheral surface 12a of the drum 12 and each have the barrel 2 in which a metal M soluble in the electrolytic solution 11 during current application is stored in an appropriate amount, which are disposed in an sealed container 13. The distances between the electrode devices 1 and the peripheral surface 12a of the drum 12 are set to a prescribed range that provides a more efficient electrolysis state. The manufacturing apparatus also includes a circulator 14 for the electrolytic solution 11, a reservoir 15 for the electrolytic solution 11, and a stirrer 16 for stirring the electrolytic solution 11 in the reservoir 15. Since the space between the peripheral surface 12a of the drum 12 and the electrode devices 1 is filled with the electrolytic solution 11 to a liquid surface 11a, the plural electrode devices 1 having the metal M to be an anode and a part of the peripheral surface 12a of the drum 12 (corresponding to the cathode 8 as shown in FIG. 5) which has the opposite polarity to the electrode devices 1 are in a state of being immersed in the electrolytic solution 11. In addition, the inside of the sealed container 13 is filled with the electrolytic solution 11 to a liquid surface 11b, and the inside of the reservoir 15 is filled with the electrolytic solution 11 to a liquid surface 11c.

When a metal foil 10 is formed with the above manufacturing apparatus, the drum 12 is made into a state of continuously rotating on its axis in a direction shown by an arrow 18 by a rotation axis 12b, the barrels 2 provided in the plural electrode devices 1 are made into a state of rotating on its axis in a pattern of the intermittent driving or the continuous driving as described above, and while keeping the states, current is appropriately applied between the peripheral surface 12a of the drum 12 and the peripheral surface 3a of the shaft 3 passing through the inside of the barrel 2, thereby electrodepositing a metal film 10a containing a component of the metal M on the peripheral surface 12a of the drum 12. During the current application, it is preferred that the volume of the metal M to be an anode is always kept to a stable state by incorporating a process for introducing, into the barrels 2 of the electrode devices 1, the metal M in an amount corresponding to the volume reduction due to consumption by electrolysis of the metal M stored inside the barrel 2.

By the above operation, the metal film 10a is electrodeposited on the peripheral surface 12a of the drum 12 which rotates on its axis, and the metal film 10a is continuously peeled from the peripheral surface 12a of the drum 12 which rotates on its axis, whereby the metal foil 10 can be formed. In this manufacturing apparatus, the metal film 10a can be peeled to continuously form the metal foil 10, and immediately after that, the metal foil 10 can be continuously drawn in a direction shown by an arrow 19 while draining the liquid on the front and back surfaces by a wiper 17 provided on the outlet side of the sealed container 13, and the drawn metal foil 10 can be further continuously wound on a winding reel (not shown). Incidentally, degradation of the electrolytic solution 11 due to absorption of moisture is preferably suppressed by making the inside of the sealed container 13 into an anaerobic dry atmosphere with a dew point of −40 degrees or lower.

In the present invention, the metal M. to be an anode may be, for example, an aluminum alloy containing 97% by mass or more of aluminum, a substantially pure aluminum containing 99.9% by mass or more of aluminum, and the like. Incidentally, when an aluminum alloy containing less than 97% by mass of aluminum is used as the metal M, it should be noted that the amount of the sludge coat produced during current application is possibly increased to reduce the electrolysis efficiency.

The above manufacturing apparatus is configured so that the electrolytic solution 11 is forcibly circulated by the circulator 14 while the metal foil 10 is continuously formed. Specifically, the circulator 14 sucks the electrolytic solution 11 from the reservoir 15 in the direction shown by an arrow 20a and forcibly feeds it in the direction shown by an arrow 20b, whereby the liquid flow of the electrolytic solution 11 passing among the plural electrode devices 1 toward the peripheral surface 12a of the drum 12 can be made. Then, the liquid flow reaching the peripheral surface 12a of the drum 12 turns to the direction along the peripheral surface 12a, goes toward the liquid surface 11a along the peripheral surface 12a, and overflows from the liquid surface 11a as shown by an arrows 20d. Then, the overflowing electrolytic solution 11 drops onto the liquid surface 11b, flows in the direction shown by an arrow 20e, and returns to the reservoir 15. Owing to the circulation of the electrolytic solution 11 by the circulator 14 and the sufficient stirring of the electrolytic solution 11 by the stirrer 16 in the reservoir 15, the electrolytic solution 11 being in a state of having a homogenous metal ion concentration and temperature can be continuously circulated. Incidentally, in the circulation process of the electrolytic solution 11, the flow rate control is preferably conducted by providing a flowmeter at an appropriate point in the circulation path including the circulator 14.

When the electrode device 1 includes the liquid introducing portion 5 for ejecting the electrolytic solution 11 into the barrel 2 as described above, by means not only of the electrolytic solution 11 circulated as described above, but also of the electrolytic solution 11 ejected from the liquid introducing portion 5 into the barrel 2, a liquid flow of the electrolytic solution 11 having a homogeneous metal ion concentration toward the peripheral surface 12a of the drum 12 shown by an arrow 20f can be made. The supply of the electrolytic solution 11 toward the liquid introducing portion 5 in this case may be achieved, for example, by branching from the circulator 14, or achieved by providing a dedicated liquid supplier (not shown).

Incidentally, the manufacturing apparatus as shown in FIG. 14 is not limited to the manufacturing apparatus having a structure of the barrel 2 as shown in FIG. 1, etc., but can be widely applied to continuous manufacture of a metal foil and is an effective manufacturing apparatus, and can solely configure one invention. For example, there can be provided a manufacturing apparatus of a metal foil which includes a container (electrolytic solution tank) that holds an electrolytic solution which is an electroconductive liquid and has a foil drawing port for drawing the metal foil, and includes a cathode drum capable of rotating on its axis (rotation) and plural electrode devices (anode devices) inside the container, wherein the plural electrode devices (anode devices) are arranged so as to face the cathode drum along the peripheral surface thereof, and each electrode device (anode device) stores a metal (anode metal) soluble in the electrolytic solution during current application, and includes a barrel capable of rotating on its axis (rotation).

Using such a manufacturing apparatus of a metal foil, a method for manufacturing a metal foil can be provided in which current is applied via the electroconductive liquid (electrolytic solution) between the cathode drum rotating on its axis and the metal (anode metal) inside the barrels rotating on its axis provided in the electrode devices (anode devices), the metal film containing a component of the metal is continuously electrodeposited on the peripheral surface of the cathode drum, and the metal film is continuously peeled from the peripheral surface of the cathode drum, whereby the metal foil can be continuously formed. In addition, when the barrels provided in the electrode devices (anode devices) each rotate on its axis, the metal stored in an appropriate amount inside the barrel is stirred, and collision or rubbing of the metals with each other occurs. Owing to stirring of the metals or abrasion action by collision or rubbing of the metals with each other, production of the sludge coat on the metal surfaces by electrolysis is suppressed and in addition, the sludge coat, even if produced on the metal surfaces, can be appropriately removed.

For confirming the effectivity of the electrode device of the present invention as described above, the method for manufacturing a metal foil of the present invention as described above was applied using a manufacturing apparatus having the same configuration as that as shown in FIG. 14 to manufacture an aluminum foil having a thickness of 9 μm, a width of 20 mm, and a length of about 20 m (invention example), and a tensile test was performed according to the annex A.2.3 of JIS-C6515: 1998 (cupper foil for printed wiring board). The aluminum foil test samples were sampled at a length (foil formation length) around 1 m and around 20 m from the beginning of the foil formation. However, in the manufacturing apparatus, two electrode devices each provided with a barrel having the cross sectional structure as shown in FIG. 9 and having a charging rate with the metal M of 95% were disposed to simplify the configuration on the anode side, and a cathode drum was configured so as to be suited to the arrangement of the electrode devices. The driving pattern of the barrel was an intermittent driving in which rest for 5 minutes and rotation (3 rpm) for 40 seconds are alternately repeated, and the electrolytic solution temperature was controlled to be about 100° C. and the applied current was controlled to be 15 A. On the other hand, for comparison, in place of the two electrode devices as described above, an aluminum curved plate was disposed so as to face the surface of the torso of the cathode drum, and aluminum foil having the same size (comparative example) was manufactured while controlling the electrolytic solution temperature to be about 100° C. and the applied current to be 15 A.

As a result of the tensile test as described above, the tensile strength at around 1 m from the beginning of the foil formation was 230 MPa in the comparative example, and was 250 MPa in the invention example, thereby an increase effect of about 8.7% was recognized. The tensile strength at around 20 m from the beginning of the foil formation was 190 MPa in the comparative example, and was 245 MPa in the invention example, thereby a great increase effect of about 22.4% was recognized. In addition, as for the variation in the tensile strength depending on the foil formation length, the tensile strength was 230 MPa at around 1 μm and 190 MPa at around 20 m in the comparative example, and a great reduction of about 17.4% was recognized. On the other hand, in the invention example, the tensile strength is 250 MPa at around 1 m and 245 MPa at around 20 m, and it was found that the reduction remained only about 2.0%. Accordingly, the electrode device of the present invention including a barrel whose inside is charged with an appropriate amount of the metal M and which rotates on its axis, and the method for manufacturing a metal foil of the present invention using the same were confirmed to be effective.

INDUSTRIAL APPLICABILITY

The electrode device of the present invention and the method for manufacturing a metal foil using the same can be utilized for continuous manufacture of a metal foil by an electrolytic process.

EXPLANATION OF REFERENCE NUMERALS

1. Electrode device, 2. Barrel, 2*a*. Through hole, 2*b*. Outer wall, 2*c*. Partition wall, 2*d*. Chamber, 2*e*. Gap, 2*f*. Arrow, 2*g*. Protrusion, 3. Shaft, 3*a*. Peripheral surface, 3*b*. Outer cylinder, 3*c*. Axis body, 3*d*. Taper surface, 4. Metal introducing portion, 5. Liquid introducing portion, 6. Driving axis, 6*a*. Gear, 6*b*. Gear, 7. Sliding portion, 8. Cathode, 10. Metal foil, 10*a*. Metal film, 11. Electrolytic solution, 11*a*. Liquid surface, 11*b*. Liquid surface, 11*c*. Liquid surface, 12. Drum, 12*a*. Peripheral surface, 12*b*. Rotation axis, 13. Sealed container, 14. Circulator, 15. Reservoir, 16. Stirrer, 17. Wiper, 18. Arrow, 19. Arrow, 20*a* to 20*f*. Arrows, M. Metal, S. Contact point

The invention claimed is:

1. A method for manufacturing a metal foil, comprising:
    immersing, in an electroconductive liquid, an electrode device in which a metal soluble in the liquid during current application is stored and a part of a peripheral surface of a drum having a different polarity from that of the electrode device, the electrode device comprising a barrel which has an outer wall having plural through holes and can store a metal soluble in the liquid during current application, a shaft passing through the inside of the barrel and having a peripheral surface to which current can be applied, and a metal introducing portion for introducing the metal into the barrel, wherein the barrel rotates on its axis;
    applying current between the peripheral surface of the drum and the peripheral surface of the shaft of the electrode device while allowing the barrel of the electrode device to rotate on its axis and also allowing the drum to rotate on its axis in one direction;
    electrodepositing a metal film containing a component of the metal on the peripheral surface of the drum; and
    peeling the metal film from the peripheral surface of the drum, thereby forming the metal foil.

2. The method for manufacturing a metal foil according to claim 1, which comprises a process for introducing the metal into the barrel of the electrode device during current application.

3. The method for manufacturing a metal foil according to claim 1, wherein the barrel of the electrode device is intermittently rotated.

4. The method for manufacturing a metal foil according to claim 1, wherein the metal contains 97% by mass or more of aluminum.

\* \* \* \* \*